US010153005B1

(12) United States Patent
Ayanoor-Vitikkate et al.

(10) Patent No.: US 10,153,005 B1
(45) Date of Patent: Dec. 11, 2018

(54) CONTAINER FLANGE CONFIGURATIONS WITH INCREASED DIFFUSION LENGTH FOR HERMETIC SEALING OF DATA STORAGE SYSTEMS AND DEVICES

(71) Applicant: Western Digital Technologies, Inc., San Jose, CA (US)

(72) Inventors: Vipin Ayanoor-Vitikkate, Union City, CA (US); Toshiki Hirano, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/669,881

(22) Filed: Aug. 4, 2017

(51) Int. Cl.
*G11B 33/14* (2006.01)
*G11B 33/02* (2006.01)

(52) U.S. Cl.
CPC ........ *G11B 33/1486* (2013.01); *G11B 33/022* (2013.01); *G11B 33/148* (2013.01); *G11B 33/1446* (2013.01); *G11B 33/1466* (2013.01)

(58) Field of Classification Search
CPC ......................... G11B 33/1446; G11B 33/1466
USPC ............................................ 360/99.21, 99.22
See application file for complete search history.

(56) References Cited

U.S. PATENT DOCUMENTS

| 4,367,503 | A | 1/1983 | Treseder |
| 4,686,592 | A | 8/1987 | Carroll et al. |
| 5,454,157 | A | 10/1995 | Ananth et al. |
| 6,023,392 | A | 2/2000 | Kim |
| 6,226,143 | B1 | 5/2001 | Stefanksy |
| 6,560,064 | B1 | 5/2003 | Hirano |
| 7,062,387 | B1 | 6/2006 | Burns et al. |
| 7,123,440 | B2 | 10/2006 | Albrecht et al. |
| 7,218,473 | B2 | 5/2007 | Bernett et al. |
| 7,315,447 | B2 | 1/2008 | Inoue et al. |
| 7,365,937 | B2 | 4/2008 | Gunderson |
| 7,729,083 | B2 * | 6/2010 | Hatchett ............... G11B 25/043 360/99.21 |
| 7,821,735 | B1 * | 10/2010 | Bogacz .............. G11B 33/1466 360/99.21 |
| 7,914,858 | B1 | 3/2011 | deJesus et al. |
| 7,986,490 | B2 | 7/2011 | Hirono et al. |
| 8,014,167 | B2 | 9/2011 | Gunderson et al. |

(Continued)

OTHER PUBLICATIONS

NIDEC Corporation, Helium-Filled Hard Disk Drives, downloaded from http://www.nidec.com/en-EU/technology/story/helium_hdd/ on Feb. 17, 2017, 3 pages.

(Continued)

*Primary Examiner* — Jefferson Evans
(74) *Attorney, Agent, or Firm* — John D. Henkhaus

(57) ABSTRACT

A hermetically-sealed container for one or more data storage devices may include a first container part or base including a planar main portion, a plurality of sidewalls extending from the main portion, and a plurality of diffusion length extender flanges extending inward or outward from a corresponding sidewall. A pressure-sensitive adhesive tape, including a layer of adhesive and a layer of low-permeability material, is positioned at the interface or edge of each flange to hermetically seal the container, whereby the diffusion length corresponding to the leakage of gas from the hermetically-sealed container corresponds generally to the width of the flange(s). The hermetically-sealed container may then be filled with a lighter-than-air gas such as helium.

24 Claims, 5 Drawing Sheets

(56) References Cited

U.S. PATENT DOCUMENTS

| | | | |
|---|---|---|---|
| 8,194,348 B2 | 6/2012 | Jacoby et al. | |
| 8,196,284 B2 | 6/2012 | Uefune et al. | |
| 8,199,425 B1 | 6/2012 | Gustafson et al. | |
| 8,248,724 B2 | 8/2012 | Hayakawa et al. | |
| 8,279,552 B2 | 10/2012 | Stipe | |
| 8,427,787 B2 | 4/2013 | McGuire, Jr. | |
| 8,451,559 B1* | 5/2013 | Berding | G11B 33/1466 360/99.21 |
| 8,514,514 B1 | 8/2013 | Berding et al. | |
| 8,646,781 B2* | 2/2014 | Gunderson | F16J 15/0806 277/312 |
| 8,659,849 B2 | 2/2014 | Hayakawa et al. | |
| 8,934,194 B2 | 1/2015 | Schreck | |
| 9,001,458 B1 | 4/2015 | Vitikkate et al. | |
| 9,058,851 B1 | 6/2015 | Hanke | |
| 9,336,817 B1* | 5/2016 | Hirasawa | G11B 19/2009 |
| 9,522,446 B2 | 12/2016 | Law et al. | |
| 9,536,572 B2 | 1/2017 | Lapp et al. | |
| 9,612,629 B2 | 4/2017 | Hirano et al. | |
| 9,683,138 B2 | 6/2017 | Furuta et al. | |
| 9,721,619 B2* | 8/2017 | Sudo | G11B 25/043 |
| 9,818,453 B1* | 11/2017 | Lapp | G11B 33/1486 |
| 9,818,454 B1* | 11/2017 | Albrecht | G11B 33/1466 |
| 2002/0089782 A1* | 7/2002 | Hearn | G11B 25/043 360/99.21 |
| 2003/0179489 A1* | 9/2003 | Bernett | G11B 33/1466 360/97.22 |
| 2006/0034010 A1* | 2/2006 | Abe | G11B 33/1466 360/99.21 |
| 2006/0050429 A1 | 3/2006 | Gunderson et al. | |
| 2007/0035872 A1* | 2/2007 | Hayakawa | G11B 25/043 360/99.21 |
| 2007/0294777 A1* | 12/2007 | Kobayashi | G11B 33/08 726/34 |
| 2008/0088969 A1* | 4/2008 | Uefune | G11B 25/043 360/99.21 |
| 2009/0097375 A1 | 4/2009 | Uefune et al. | |
| 2011/0212281 A1 | 9/2011 | Jacoby et al. | |
| 2011/0310509 A1 | 12/2011 | Stipe | |
| 2012/0176701 A1 | 7/2012 | Schreck | |
| 2012/0275054 A1 | 11/2012 | McGuire, Jr. et al. | |
| 2013/0170074 A1 | 7/2013 | Hayakawa et al. | |
| 2015/0355685 A1 | 12/2015 | Hirano et al. | |
| 2015/0359115 A1 | 12/2015 | Hirano et al. | |
| 2016/0104515 A1 | 4/2016 | Strange | |
| 2016/0307606 A1 | 10/2016 | McGuire, Jr. et al. | |
| 2016/0329081 A1* | 11/2016 | McGuire, Jr. | G11B 25/043 |
| 2016/0376473 A1* | 12/2016 | Furuta | G11B 33/1446 360/99.16 |
| 2017/0053678 A1 | 2/2017 | Albrecht et al. | |
| 2017/0053680 A1* | 2/2017 | Albrecht | G11B 25/043 |
| 2017/0169862 A1 | 6/2017 | Sudo et al. | |
| 2017/0236557 A1* | 8/2017 | Albrecht | G11B 33/1466 360/97.12 |

OTHER PUBLICATIONS

Kovar, Joseph F., "Western Digital's HGST: Helium-Filled Hard Drives", CRN News, Analysis, and Perspective for VARS and Technology Integrators, Sep. 13, 2012, pp. 1-3, URL: http://www.crn.com/news/storage/240007269/western-digitals-hgst-helium-filled-hard-drives.htm?pgno=2.

International Search Report and Written Opinion dated Sep. 14, 2018 from related PCT Serial No. PCT/US2018/037143, 13 pages.

* cited by examiner

FORM A (FIRST) CONTAINER PART COMPRISING A SUBSTANTIALLY PLANAR MAIN PORTION, A PLURALITY OF FLANGE SIDEWALLS EXTENDING FROM THE MAIN PORTION, AND A PLURALITY OF DIFFUSION LENGTH EXTENDER FLANGES, WHEREIN A FLANGE EXTENDS FROM A CORRESPONDING SIDEWALL
802

COUPLE A SECOND CONTAINER PART WITH THE FIRST CONTAINER PART TO FORM AN UNSEALED CONTAINER
804

HERMETICALLY SEAL THE (UNSEALED) CONTAINER BY APPLYING A PRESSURE-SENSITIVE ADHESIVE (PSA) SHEET, COMPRISING A LAYER OF ADHESIVE AND A LAYER OF LOW PERMEABILITY MATERIAL, AT AN INTERFACE ASSOCIATED WITH EACH FLANGE
806

CONTAINER FLANGE CONFIGURATIONS WITH INCREASED DIFFUSION LENGTH FOR HERMETIC SEALING OF DATA STORAGE SYSTEMS AND DEVICES

FIELD OF EMBODIMENTS

Embodiments of the invention may relate generally to data storage devices and particularly to approaches for reducing the leak rate in adhesive-based hermetically-sealed hard disk drives and storage systems.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

HDDs are being manufactured which are hermetically sealed with helium inside. Further, other gases that are lighter than air have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack, and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants.

Electronic systems that require a hermetically sealed internal volume (e.g., a lighter-than-air gas filled, sealed HDD or system of HDDs) need a way of preventing the occurrence of leakage through the interface between a container cover and a corresponding container base to which the cover is coupled. One approach may be to adhesively bond the cover to the base by applying a pressure-sensitive adhesive (PSA) around the component interface, which functions as a barrier to gas leakage and moisture passage. A PSA-based seal offers more reworkability of the seal, as compared to an epoxy seal. Furthermore, a tape seal is a reasonable approach to the use of a PSA seal because a very thin PSA sheet (in the range of 20-100 μm) can be utilized, which can achieve a small diffusion area that aids in minimizing the leak rate. In all cases, the critical diffusion length is the smallest distance through or around the PSA sheet (or simply "PSA") that the enclosed lighter-than-air gas would need to travel to leak out of the container. In the context of a PSA without a metal layer, this diffusion length would typically equate to the thickness of the PSA sheet, as the gas can diffuse through the PSA. In the context of a PSA having a metal layer to prevent diffusion of the lighter-than-air gas through the PSA, this diffusion length would typically equate to shortest path around, i.e., along the length of, the PSA.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 8 is a flow diagram illustrating a method of manufacturing a hermetically-sealed container, according to an embodiment.

DETAILED DESCRIPTION

Approaches to hermetically sealing a container for one or more data storage devices (e.g., a hard disk drives or optical disk drives) are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a digital data storage device (DSD), such as a hard disk drive (HDD), and in the context of a system of multiple DSDs/HDDs. Thus, in accordance with an embodiment, a plan view illustrating an HDD 100 is shown in FIG. 1 to illustrate an exemplary operating context.

Figure 1:
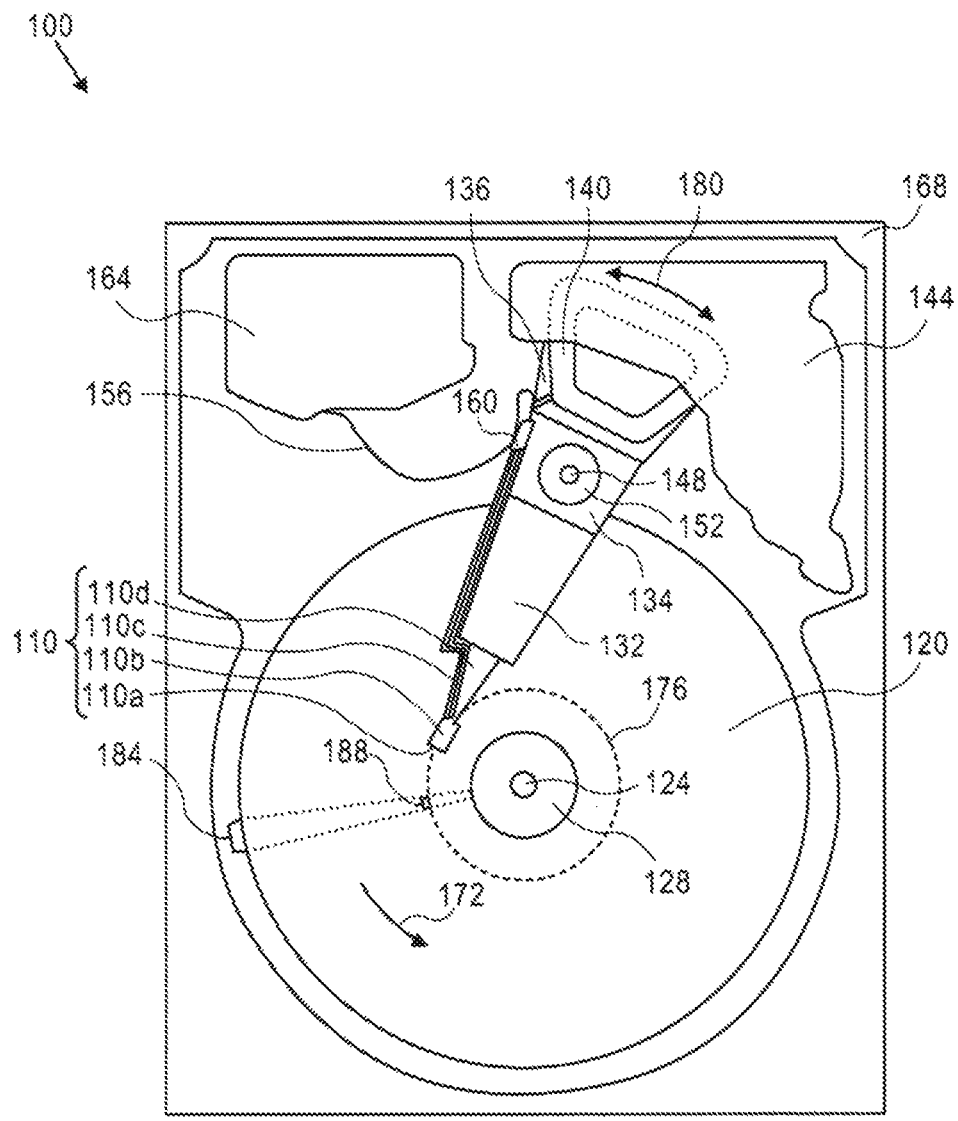
FIG. 1 is a plan view illustrating a hard disk drive (HDD), according to an embodiment.

FIG. 1 illustrates the functional arrangement of components of the HDD 100 including a slider 110*b* that includes a magnetic read-write head 110*a*. Collectively, slider 110*b* and head 110*a* may be referred to as a head slider. The HDD 100 includes at least one head gimbal assembly (HGA) 110 including the head slider, a lead suspension 110*c* attached to the head slider typically via a flexure, and a load beam 110*d* attached to the lead suspension 110*c*. The HDD 100 also includes at least one recording medium 120 rotatably mounted on a spindle 124 and a drive motor (not visible) attached to the spindle 124 for rotating the medium 120. The read-write head 110*a*, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110*a*, are transmitted by a flexible cable assembly (FCA) 156 (or "flex cable"). Interconnection between the flex cable 156 and the head 110*a* may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110*b* rides so that the slider 110*b* flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110*b* rides.

The electrical signal provided to the voice coil 140 of the VCM enables the head 110*a* of the HGA 110 to access a track 176 on which information is recorded. Thus, the armature 136 of the VCM swings through an arc 180, which enables the head 110*a* of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110*a* of the HGA 110 reads the servo-burst-signal pattern, which provides a position-error-signal (PES) to the servo electronics, which controls the electrical signal provided to the voice coil 140 of the VCM, thereby enabling the head 110*a* to follow the track 176. Upon finding the track 176 and identifying a particular sectored track portion 188, the head 110*a* either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "hermetic" will be understood to describe a sealing arrangement designed to have nominally no (or negligible) gaseous leakage or permeation paths. While terms such as "hermetic", "hermetically-sealed", "negligible leakage", "no leakage", etc. may be used herein, note that such a system would often still have a certain amount of permeability and, therefore, not be absolutely leak-free. Hence, the concept of a desired or target "leak rate" may be used herein.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Recall that electronic systems that require a hermetically sealed internal volume (e.g., a lighter-than-air gas filled, sealed HDD or system of HDDs) need a way of preventing the occurrence of leakage through the cover-to-base interface, with one approach relying on a pressure-sensitive adhesive (PSA)-based seal at the component interface. In the case of light molecules like helium, the leak rate depends on a number of factors, such as the temperature within the tray unit, the diffusion length through the PSA, and the partial pressure differential inside and outside the unit.

Sealed Data Storage System Assembly

Figure 2:
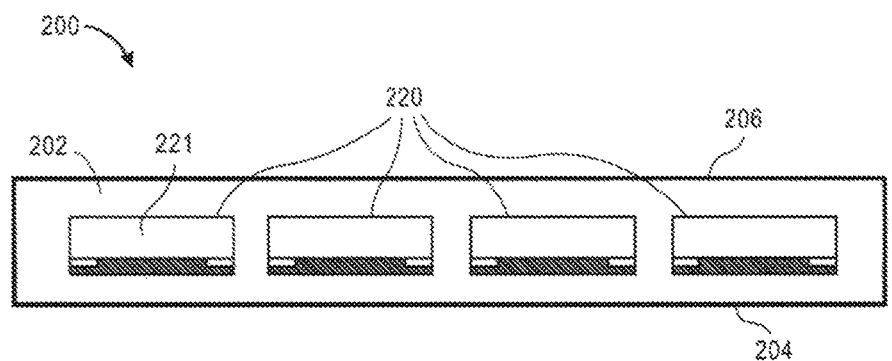
FIG. 2 is a cross-sectional side view diagram illustrating a data storage system assembly (or "tray"), according to an embodiment.

FIG. 2 is a cross-sectional side view diagram illustrating a data storage system assembly (or "tray"), according to an embodiment. Data storage system tray 200 ("tray 200") comprises a hermetically-sealed container 202 (or "unit") having a lighter-than-air gas enclosed therein, according to an embodiment. For non-limiting examples, a substantially helium or substantially nitrogen gas may be injected into and maintained within the container 202. The tray 200 comprises a base 204 and a cover 206 coupled with the base 204, which together form the container 202. Tray 200 can be utilized to house a plurality of data storage devices 220 within the hermetically-sealed container 202.

According to an embodiment, a plurality of "soft-sealed" data storage devices 220 (e.g., hard disk drives) are housed in the container 202 of tray 200. The data storage devices 220 are considered "soft-sealed" because each device comprises a device enclosure 221 in which a lighter-than-air gas is contained (e.g., the same lighter-than-air gas that is contained within the hermetically-sealed enclosure 202), and a temporary or non-hermetic seal that temporarily maintains the lighter-than-air gas within the device enclosure 221. The sealing capabilities of such a "soft seal" are functionally beyond the sealing capabilities of an unsealed or conventionally-sealed device (e.g., those that have a breather filter to maintain environmental pressure equilibrium between the inside and outside of the device, and to maintain a relatively clean internal environment within the device, but which typically operate with air inside), but not to the level of the sealing capabilities provided by a hermetically-sealed device (e.g., those in which a nominal leakage rate is maintained over a significant duration of time, such as for ten years, and which typically operate with a lighter-than-air gas sealed inside using, e.g., solder, an epoxy adhesive bond line, a laminated film, etc.). Over a period of time, the lighter-than-air gas sealed within the hermetically-sealed enclosure 202 of tray 200 is intended to equilibrate with the lighter-than-air gas contained within the device enclosure 221.

The manner in which each data storage device 220 is soft-sealed may vary from implementation to implementation. For non-limiting examples, inexpensive elastomeric seals, adhesive coating, bag sealing, and the like may be utilized for the soft sealing of each device 220. Note that conventional HDDs are commonly soft-sealed for a period of time during manufacturing, such as for the self-servowrite (SSW) process, using stickers (e.g., metallic, or metal foil) over enclosure orifices, for example. Hence, known SSW sealing techniques may be feasible approaches to soft sealing each device 220.

Container Joint Configurations

Figure 3A:
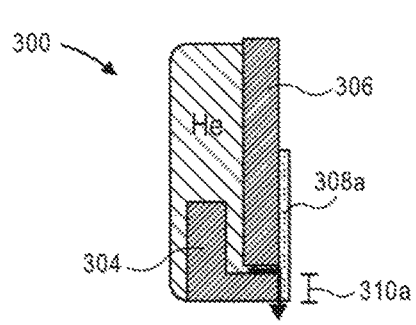
FIG. 3A is a cross-sectional side view illustrating a PSA-based L-joint sealing technique, according to an embodiment.

Typical hermetic containers may have L-joints or flat faced-joints where the container cover (e.g., cover 206 of FIG. 2) forms a joint with the container base 204 (e.g., base 204 of FIG. 2), and is sealed using a PSA sheet. FIG. 3A is a cross-sectional side view illustrating a PSA-based L-joint sealing technique, according to an embodiment. L-joint 300 ("joint 300") is depicted having a cover 306 mated with an L-shaped portion of a base 304, forming a hermetic container to contain a lighter-than-air gas, depicted here in a non-limiting example as helium (He). PSA sheet 308a is utilized at the interface of the cover 306 and the base 304 to hermetically seal a container (e.g., container 200 of FIG. 2) to which joint 300 is constituent. As mentioned, the critical diffusion length for diffusion or leakage of the gas out of the container is the smallest distance through or around the PSA sheet 308a that the enclosed gas would need to travel to leak out of the container (depicted generally with a block arrow). In the context of a PSA sheet 308a having a metal layer to prevent or inhibit diffusion of the gas through the PSA sheet, this diffusion length 310a equates to shortest path around, i.e., along the length of, the PSA sheet 308a. Hence, a longer diffusion length equates to a better seal, as the leak rate is inversely proportional to this diffusion length.

Figure 3C:
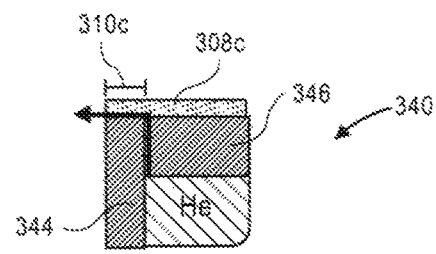
FIG. 3C is a cross-sectional side view illustrating a PSA-based flat face-joint sealing technique, according to an embodiment.
Figure 3B:
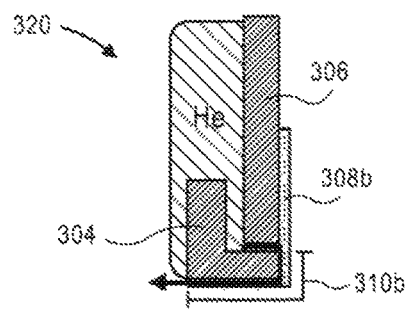
FIG. 3B is a cross-sectional side view illustrating a PSA-based L-joint sealing technique over a corner, according to an embodiment.

FIG. 3B is a cross-sectional side view illustrating a PSA-based L-joint sealing technique over a corner, according to an embodiment. Similarly to joint 300, L-joint 320 ("joint 320") of FIG. 3B is depicted having a cover 306 mated with an L-shaped portion of a base 304, forming a hermetic container to contain a lighter-than-air gas, depicted here in a non-limiting example as helium (He). PSA sheet 308b is utilized at the interface of the cover 306 and the base 304, including around the corner formed by base 304 and the cover 306, to hermetically seal a container (e.g., container 200 of FIG. 2) to which joint 320 is constituent. Here again, the critical diffusion length for diffusion or leakage of the gas out of the container is the smallest distance through or around the PSA sheet 308b that the enclosed gas would need to travel to leak out of the container (depicted generally with a block arrow). In the context of a PSA sheet 308b having a metal layer to prevent or inhibit diffusion of the gas through the PSA sheet, this diffusion length 310b equates to shortest path along the length of the PSA sheet 308b.

FIG. 3C is a cross-sectional side view illustrating a PSA-based flat face-joint sealing technique, according to an embodiment. Flat face joint 340 ("joint 340") is depicted having a cover 346 generally abutted with a sidewall of a base 344, forming a hermetic container to contain a lighter-than-air gas, depicted here in a non-limiting example as helium (He). PSA sheet 308c is utilized at the interface of the cover 346 and the base 344 to hermetically seal a container (e.g., container 200 of FIG. 2) to which joint 340 is constituent. Here again, the critical diffusion length for diffusion or leakage of the gas out of the container is the smallest distance through or around the PSA sheet 308c that the enclosed gas would need to travel to leak out of the container (depicted generally with a block arrow). In the context of a PSA sheet 308c having a metal layer to prevent or inhibit diffusion of the gas through the PSA sheet, this diffusion length 310c equates to shortest path around, i.e., along the length of, the PSA sheet 308c.

Figure 3D:
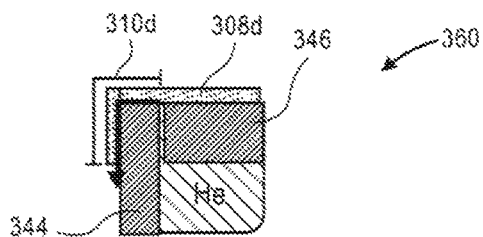
FIG. 3D is a cross-sectional side view illustrating a PSA-based flat face-joint sealing technique over a corner, according to an embodiment.

FIG. 3D is a cross-sectional side view illustrating a PSA-based flat face-joint sealing technique over a corner, according to an embodiment. Similarly to joint 340, flat face-joint 360 ("joint 360") of FIG. 3D is depicted having the cover 346 generally abutted with a sidewall of the base 344, forming a hermetic container to contain a lighter-than-air gas, depicted here in a non-limiting example as helium (He). PSA sheet 308d is utilized at the interface of the cover 346 and the base 344, including around the corner formed by base 344 and the cover 346, to hermetically seal a container (e.g., container 200 of FIG. 2) to which joint 360 is constituent. Here again, the critical diffusion length for diffusion or leakage of the gas out of the container is the smallest distance through or around the PSA sheet 308d that the enclosed gas would need to travel to leak out of the container (depicted generally with a block arrow). In the context of a PSA sheet 308d having a metal layer to prevent or inhibit diffusion of the gas through the PSA sheet, this diffusion length 310d equates to shortest path along the length of the PSA sheet 308d.

While the foregoing sealing techniques illustrated in FIGS. 3A-3D may be effective to hermetically-seal a container in order to meet a certain leak rate, reducing the leak rate even further may be achieved by enlarging or lengthening (e.g., maximizing) the critical diffusion length, in view of other structural and configurational constraints, according to embodiments. However, in the case of corner applications of PSA sheet, such as with PSA sheet 308b and 308d, it can be significantly difficult to guarantee good adhesion of the PSA sheet at the corner. Thus, if the tape adhesion is not ideal, internal gas can leak along the corners and eventually escape to the outside.

Increasing Container Diffusion Length with Inward Flanges

Figure 4A:
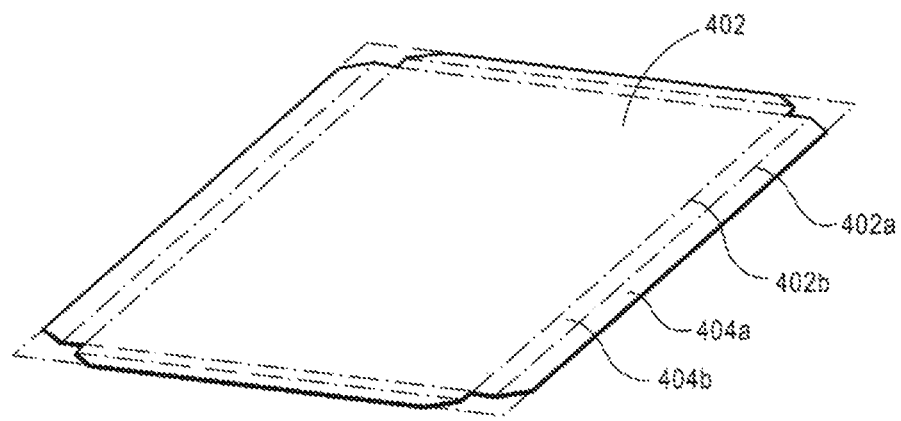
FIG. 4A is a top perspective view illustrating a sheet metal stock, according to an embodiment.
Figure 4B:
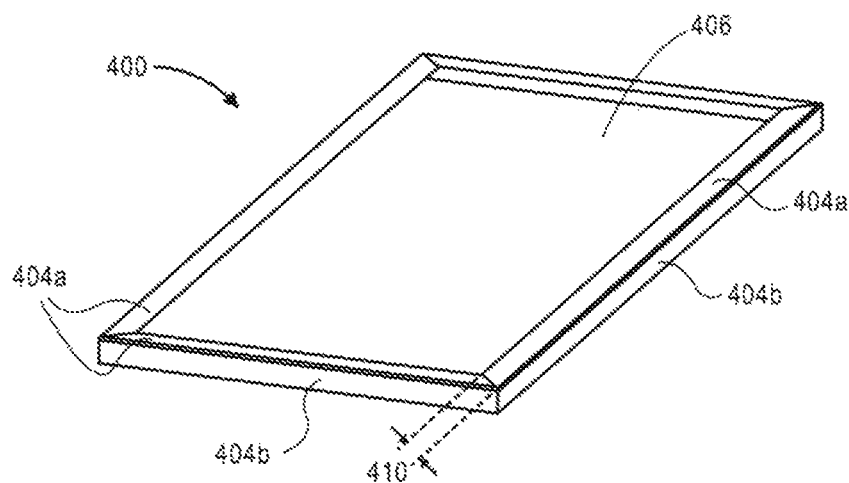
FIG. 4B is a top perspective view illustrating an inward-flanged container base formed from the sheet metal stock of FIG. 4A, according to an embodiment.

FIG. 4A is a top perspective view illustrating a sheet metal stock, and FIG. 4B is a top perspective view illustrating an inward-flanged container base formed from the sheet metal stock of FIG. 4A, according to an embodiment. With reference to FIG. 4A, sheet metal stock 402 ("sheet 402") is depicted with superimposed bend lines 402a and 402b, indicating a manner in which sheet 402 can be formed to create corresponding inward flange surfaces 404a and 404b (or "sidewall 404b"). That is, between the outer edge of the sheet 402 and bend line 402a is a first inward flange surface 404a, and between the bend line 402a and the bend line 402b is a second inward flange surface 404b. Note that the precise shape and scale of sheet 402 may vary from implementation to implementation and, therefore, the precise shape and scale of sheet 402 shown in FIG. 4A is for purposes of example.

With reference to FIG. 4B, upon the bending of sheet 402 along the bend line 402a and bend line 402b, an inward-flanged container base 400 ("base 400") is formed. Note that the part referred to herein as "container base 400", which may be implemented to function similarly as base 204 of the container 200 of FIG. 2, may also be implemented to function as a container cover such as cover 206 of the container 200 of FIG. 2. Inward-flanged container base 400 comprises a substantially planar main portion 406, from which a plurality of sidewalls 404b extends, from each of which a corresponding diffusion length extender flange 404a ("flange 404a") extends. Likely, the base 400 fabrication process would further include welding the corners to form a sealed based, and may require some form of polishing to make the sealing surfaces smooth enough to adhere a PSA sheet for an effective PSA sheet-based seal. Here, the diffusion length 410 equates to the final bent flange 404a width, as illustrated and described in more detail in reference to FIG. 5. Hence, the gas diffusion rate, or leak rate, may be controlled through design of a suitable flange 404a width that corresponds to a target or permissible leak rate.

Figure 5:
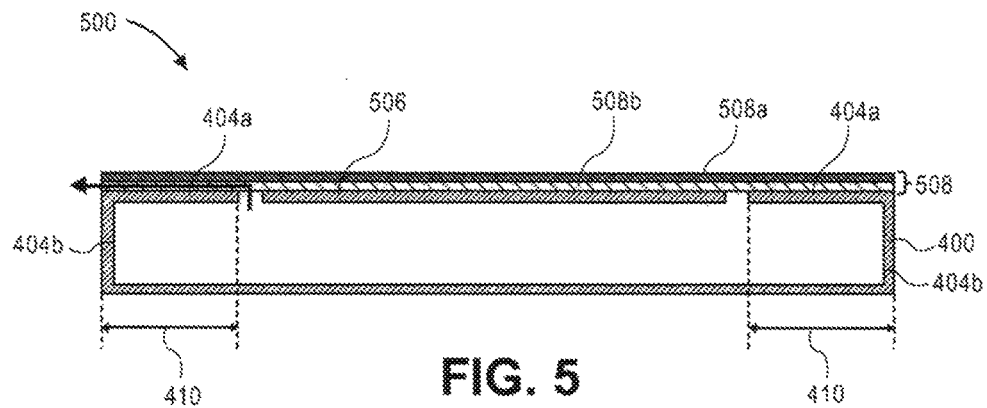
FIG. 5 is a cross-sectional side view illustrating a sealed container with the inward-flanged base of FIG. 4B, according to an embodiment.

FIG. 5 is a cross-sectional side view illustrating a sealed container with the inward-flanged base of FIG. 4B, according to an embodiment. Hermetically-sealed container 500 ("sealed container 500") comprises the inward-flanged base 400, with which a cover 506 is coupled (forming an unsealed container), and a metal-backed pressure-sensitive adhesive (PSA) tape 508 (forming a hermetically-sealed container), e.g., composed of a low-permeability material layer 508a (such as a metal layer) laminated over a PSA layer 508b. According to an embodiment, PSA sheet 508 is positioned at the edge of each flange 404a (FIG. 4B), such as at the interface of each flange 404a of the base 400 and the cover 506, thereby hermetically sealing the sealed container 500. According to an embodiment, the PSA sheet 508 is positioned over the entirety (or the substantial entirety) of each flange 404a of the base 400, in order to form a diffusion length (associated with leakage of gas from the sealed container 500) that corresponds to the length 410 that each flange 404a extends from each corresponding sidewall 404b (which may also be characterized as the width of the flange). Recall that a longer diffusion length equates to a better seal, as the leak rate is inversely proportional to this diffusion length.

According to an embodiment, the PSA sheet 508 is shaped like or formed as a sheet that covers the entirety (or the substantial entirety) of the flange 404a and the cover 506, as depicted in FIG. 5, which may afford a simpler PSA sheet 508 application process. According to another embodiment, the PSA sheet 508 is shaped like a frame that follows the flange 404a-cover 506 interface around the container 500, but does not necessarily cover a majority of the cover 506. Preferably, the PSA sheet 508 at least covers any gap that may be between the container base 400 and the cover 506. Regardless of the PSA sheet 508 configuration, with a container configuration as depicted with sealed container 500, the PSA sheet 508 only needs to adhere to a flat surface(s), i.e., there is no need to cover a corner (see, e.g., FIGS. 3B, 3D).

Increasing Container Diffusion Length with Outward Flanges

As discussed, the foregoing approach of utilizing an inward-flanged container base such as base 400 would likely require additional process steps such as welding and polishing to obtain a robust sealing capability. Furthermore, the choice of materials would be restricted to those that are readily weldable, such as steel. To avoid such additional processing, another approach is to use a simple operation(s) such as stamping or deep drawing to fabricate a container base or unit.

Figure 6:
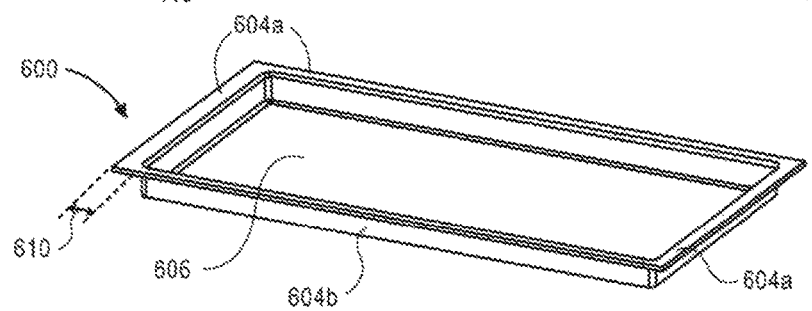
FIG. 6 is a top perspective view illustrating an outward-flanged container base, according to an embodiment.

FIG. 6 is a top perspective view illustrating an outward-flanged container base, according to an embodiment. According to an embodiment, upon stamping or deep drawing a piece of sheet metal, for example, an outward-flanged container base 600 ("base 600") is formed. Note that the part referred to herein as "container base 600", which may be implemented to function similarly as base 204 of the container 200 of FIG. 2, may also be implemented to function as a container cover such as cover 206 of the container 200 of FIG. 2. Outward-flanged container base 600 comprises a substantially planar main portion 606, from which a plurality of sidewalls 604b extends, from each of which a corresponding diffusion length extender flange 604a ("flange 604a") extends. Here, the diffusion length 610 equates to the final bent flange 604a width. Hence, the gas diffusion or leak rate may be controlled through design of a suitable flange 604a width that corresponds to a target or permissible leak rate.

Figure 7:
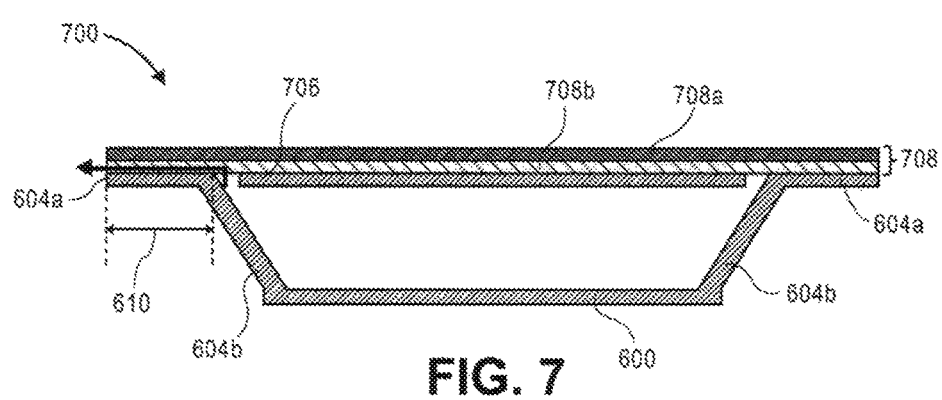
FIG. 7 is a cross-sectional side view illustrating a sealed container with the outward-flanged base of FIG. 6, according to an embodiment.

FIG. 7 is a cross-sectional side view illustrating a sealed container with the outward-flanged base of FIG. 6, according to an embodiment. Hermetically-sealed container 700 ("sealed container 700") comprises the outward-flanged base 600, with which a cover 706 is coupled (forming an unsealed container), and a metal-backed pressure-sensitive adhesive (PSA) tape 708 (forming a hermetically-sealed container), e.g., composed of a metal layer 708a laminated over a PSA layer 708b. According to an embodiment, PSA sheet 708 is positioned at the edge of each flange 604a (FIG. 6), such as at the interface of each flange 604a of the base 600 and the cover 706, thereby hermetically sealing the sealed container 700. According to an embodiment, the PSA sheet 708 is positioned over the entirety (or the substantial entirety) of each flange 604a of the base 600, in order to form a diffusion length (associated with leakage of gas from the sealed container 700) that corresponds to the length 610 that each flange 604a extends from each corresponding sidewall 604b (which may also be characterized as the width of the flange). Recall that a longer diffusion length equates to a better seal, as the leak rate is inversely proportional to this diffusion length.

According to an embodiment, the PSA sheet 708 is shaped like or formed as a sheet that covers the entirety (or the substantial entirety) of the flange 604a and the cover 706, as depicted in FIG. 7, which may afford a simpler PSA sheet 708 application process. According to an embodiment, the PSA sheet 708 is shaped like a frame that follows the flange 604a-cover 706 interface around the container 700, but does not necessarily cover a majority of the cover 706. Preferably, the PSA sheet 708 at least covers any gap that may be between the container base 600 and the cover 706. Regardless of the PSA sheet 708 configuration, with a container configuration as depicted with sealed container 700, the PSA sheet 708 only needs to adhere to a flat surface(s), i.e., there is no need to cover a corner (see, e.g., FIGS. 3B, 3D).

A Method of Manufacturing a Hermetically-Sealed Container

FIG. 8 is a flow diagram illustrating a method of manufacturing a hermetically-sealed container, according to an embodiment. The method of FIG. 8 is described with reference to, and may be implemented according to the teachings corresponding to, FIGS. 4A-7.

At block 802, a (first) container part is formed which comprises a substantially planar main portion, a plurality of sidewalls extending from the main portion, and a corresponding diffusion length extender flange extending from each of the plurality of sidewalls. For example, with reference to FIGS. 4A-4B, sheet 402 is bent into the shape of an inward-flanged container base 400, which comprises planar main portion 406, a plurality of sidewalls 404b extending from the main portion 406, and a corresponding flange 404a extending from each of the plurality of sidewalls 404b. For another example, with reference to FIG. 6, a flat metal sheet is bent, stamped, or deep drawn, for example, into the shape of an outward-flanged container base 600, which comprises planar main portion 606, a plurality of sidewalls 604b extending from the main portion 606, and a corresponding flange 604a extending from each of the plurality of sidewalls 604b.

At optional block 804, a second container part is coupled with the first container part, thereby forming an unsealed container. For example, cover 506 (FIG. 5) is coupled with inward-flanged container base 400 (FIG. 5), or cover 706 (FIG. 7) is coupled with outward-flanged container base 600 (FIG. 7). At this point, the unsealed (or temporarily sealed) container may be filled with a lighter-than-air gas such as helium, nitrogen, etc., according to known techniques, before proceeding to block 806.

At block 806, the (unsealed) container is hermetically sealed by applying a pressure-sensitive adhesive (PSA) tape, comprising an adhesive layer and a low-permeability layer, at an edge and/or interface associated with each diffusion length extender flange of the (first) container part (and the second container part, if used). For example, with reference to FIG. 5, the PSA sheet 508 is applied at the interface of each flange 404a of the inward-flanged container base 400 and the cover 506. For another example, with reference to FIG. 7, the PSA sheet 708 is applied at the interface of each flange 604a of the outward-flanged container base 600 and the cover 706. Once a hermetically-sealed container is made, such a container may be filled with a lighter-than-air gas such as helium, nitrogen, etc., according to known techniques.

While the foregoing approaches and techniques for hermetically sealing a container for one or more data storage devices such as hard disk drives (HDDs) are described herein primarily in the context of a hermetically-sealed data storage system that comprises multiple data storage devices (see, e.g., FIG. 2), the same or similar approaches and techniques may be implemented for use in hermetically sealing a single data storage device, such as an HDD. That is, the use of an inward-flanged or outward-flanged container part such as container base 400 and/or container base 600, along with a corresponding cover such as cover 506 and/or cover 706, sealed with a metal-PSA laminate tape at their interface to substantially cover the inward or outward flanges to create a suitably lengthy gas diffusion length or path, may be implemented for use as a hermetically-sealed HDD enclosure that houses conventional HDD components.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hermetically-sealed container for one or more data storage devices, the container comprising:
    a container part comprising:
        a substantially planar main portion,
        a plurality of sidewalls extending from said main portion, and
        a plurality of diffusion length extender flanges,
        wherein at least one flange of said plurality of diffusion length extender flanges extends inward from a corresponding sidewall of said plurality of sidewalls; and
    a pressure-sensitive adhesive (PSA) sheet, comprising a layer of adhesive and a layer of low-permeability material, positioned at an interface associated with each said diffusion length extender flange of said plurality of diffusion length extender flanges;
    wherein said PSA sheet hermetically seals said hermetically-sealed container.

2. The hermetically-sealed container of claim 1, wherein said low-permeability material of said PSA sheet comprises a metal layer positioned over a substantial entirety of each flange of said plurality of diffusion length extender flanges, thereby forming a diffusion length associated with leakage of gas from said hermetically-sealed container that corresponds to a length that each flange of said plurality of diffusion length extender flanges extends from said corresponding sidewall.

3. The hermetically-sealed container of claim 2, wherein said container part is a first container part, the hermetically-sealed container further comprising:
    a second container part coupled with said first container part;
    wherein said PSA sheet is positioned over an interface of each flange of said plurality of diffusion length extender flanges and said second container part.

4. The hermetically-sealed container of claim 3, wherein said PSA sheet is positioned over a substantial entirety of (1) each flange of said plurality of diffusion length extender flanges of said container part and (2) said second container part.

5. The hermetically-sealed container of claim 3, wherein said PSA sheet covers any gap that may be between said first container part and said second container part.

6. The hermetically-sealed container of claim 1, wherein at least one flange of said plurality of diffusion length extender flanges extends substantially normal from each corresponding sidewall of said plurality of sidewalls.

7. The hermetically-sealed container of claim 1, wherein each flange of said plurality of diffusion length extender flanges extends inward from each corresponding sidewall of said plurality of sidewalls.

8. The hermetically-sealed container of claim 1, wherein at least one flange of said plurality of diffusion length extender flanges extends outward from a corresponding sidewall of said plurality of sidewalls.

9. The hermetically-sealed container of claim 1, further comprising and contained therein:
    a plurality of spinning-disk data storage devices; and
    a lighter-than-air gas.

10. The hermetically-sealed container of claim 9, wherein said lighter-than-air gas comprises helium.

11. The hermetically-sealed container of claim 1, further comprising and contained therein:
    a recording disk medium rotatably mounted on a spindle;
    a head slider comprising a read-write transducer configured to write to and to read from said disk medium;
    a rotary actuator assembly configured to move said head slider to access portions of said disk medium; and
    a lighter-than-air gas.

12. The hermetically-sealed container of claim 1, further comprising and contained therein:
    a plurality of spinning-disk data storage devices; and
    a lighter-than-air gas;
    wherein said container part forms a container base.

13. The hermetically-sealed container of claim 1, further comprising and contained therein:
    a plurality of spinning-disk data storage devices; and
    a lighter-than-air gas;
    wherein said container part forms a container cover.

14. The hermetically-sealed container of claim 1, further comprising and contained therein:
    a recording disk medium rotatably mounted on a spindle;
    a head slider comprising a read-write transducer configured to write to and to read from said disk medium;
    a rotary actuator assembly configured to move said head slider to access portions of said disk medium; and
    a lighter-than-air gas;
    wherein said container part forms a container base.

15. The hermetically-sealed container of claim 1, further comprising and contained therein:
    a recording disk medium rotatably mounted on a spindle;
    a head slider comprising a read-write transducer configured to write to and to read from said disk medium;
    a rotary actuator assembly configured to move said head slider to access portions of said disk medium; and
    a lighter-than-air gas;
    wherein said container part forms a container cover.

16. A method of manufacturing a hermetically-sealed container, the method comprising:

forming a container part comprising:
- a substantially planar main portion,
- a plurality of sidewalls extending from said main portion, and
- a plurality of diffusion length extender flanges,
- wherein a corresponding flange of said plurality of diffusion length extender flanges extends inward from a corresponding sidewall of said plurality of sidewalls; and hermetically sealing said container by applying a pressure-sensitive adhesive (PSA) sheet, comprising a layer of adhesive and a layer of low-permeability material, at an interface associated with each flange of said plurality of diffusion length extender flanges.

17. The method of claim 16, wherein hermetically sealing said container includes applying said PSA sheet, having a metal layer as said low-permeability material, over a substantial entirety of each flange of said plurality of diffusion length extender flanges, such that a diffusion length associated with leakage of gas from said hermetically-sealed container corresponds to a width of each flange of said plurality of diffusion length extender flanges.

18. The method of claim 16, wherein said container part is a first container part, the method further comprising:
- coupling a second container part with said first container part to form an unsealed container;
- wherein hermetically sealing includes hermetically sealing said unsealed container by applying said PSA sheet over an interface of each flange of said plurality of diffusion length extender flanges and said second container part.

19. The method of claim 18, further comprising:
- prior to hermetically sealing said unsealed container, filling said unsealed container with a lighter-than-air gas.

20. The method of claim 18, wherein hermetically sealing said unsealed container includes applying said PSA sheet, having a metal layer as said low-permeability material, over a substantial entirety of (1) each flange of said plurality of diffusion length extender flanges and (2) said second container part.

21. The method of claim 16, wherein at least one flange of said plurality of diffusion length extender flanges extends outward from a corresponding sidewall of said plurality of sidewalls.

22. The method of claim 16, wherein said forming includes forming said container part by bending a sheet of sheet-metal.

23. The method of claim 16, wherein said forming includes forming said container part by stamping or deep drawing a sheet of sheet-metal.

24. The method of claim 16, wherein hermetically sealing said container forms a hermetically-sealed container, the method further comprising:
- filling said hermetically-sealed container with a lighter-than-air gas.

* * * * *